E. S. LEAVER AND C. E. VAN BARNEVELD.
PROCESS FOR RECOVERING METALS FROM THEIR ORES.
APPLICATION FILED JUNE 11, 1919.

1,410,936.

Patented Mar. 28, 1922.
2 SHEETS—SHEET 1.

Fig. 2ª

INVENTORS
Edmund S. Leaver
Charles E. van Barneveld
BY Arthur P. Knight
ATTORNEY.

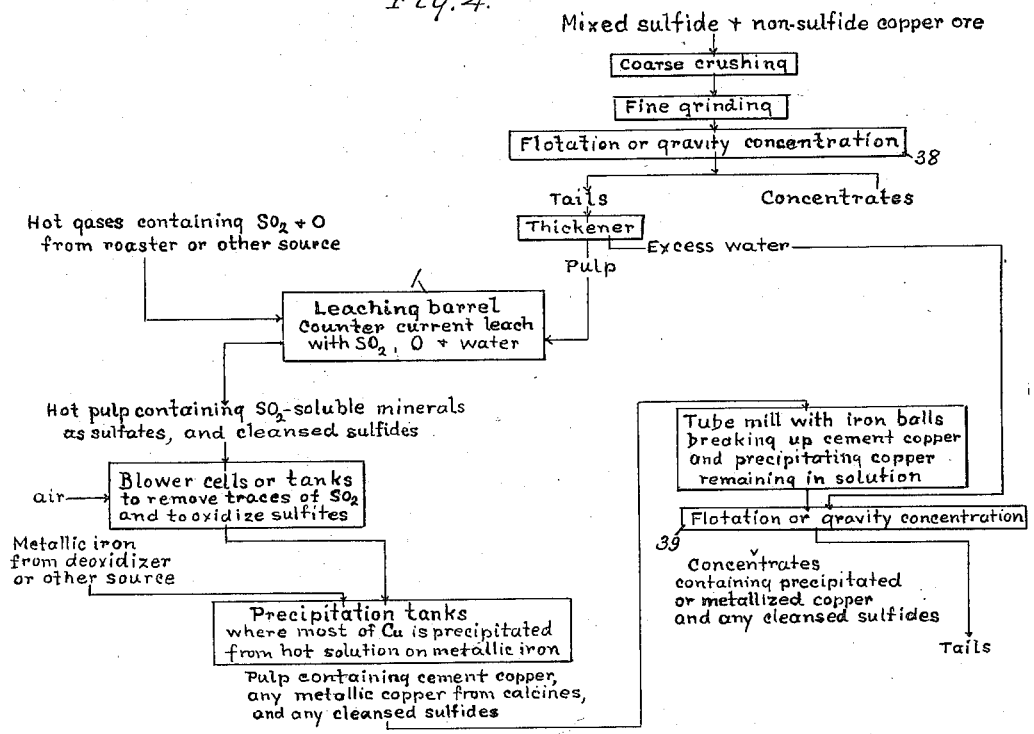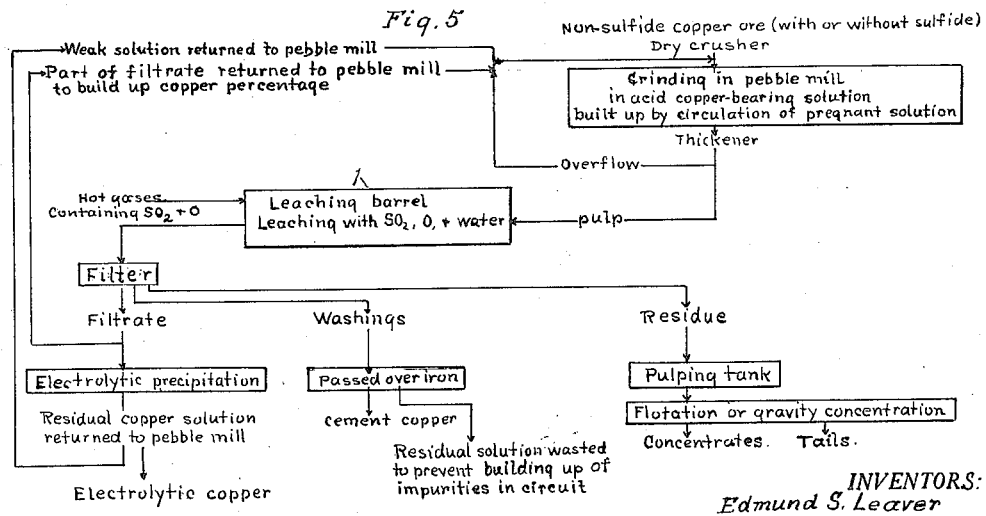

UNITED STATES PATENT OFFICE.

EDMUND S. LEAVER AND CHARLES E. VAN BARNEVELD, OF TUCSON, ARIZONA.

PROCESS FOR RECOVERING METALS FROM THEIR ORES.

1,410,936.  Specification of Letters Patent.  Patented Mar. 28, 1922.

Application filed June 11, 1919. Serial No. 303,419.

*To all whom it may concern:*

Be it known that we, EDMUND S. LEAVER and CHARLES E. VAN BARNEVELD, citizens of the United States, residing at Tucson, in the county of Pima and State of Arizona, have invented a new and useful Process for Recovering Metals from Their Ores, of which the following is a specification.

This invention relates to the recovery of copper, zinc, manganese, or other metals, from ores or metallurgical products. The invention is applicable particularly to the recovery of metals from oxidized or non-sulfide ores, but it may also be used with mixed or complex ores containing both sulfide and non-sulfide constituents and, in such case, it provides for effective recovery, for example, of the values from mixed ores containing copper in both sulfide and non-sulfide form. It is also applicable to the recovery of zinc in the non-sulfide form and of manganese in the form of higher oxides.

Our invention is based primarily on the use of sulfur dioxide, together with water, as a leaching agent on non-sulfide ores, such as oxidized copper ores. Leaching of oxidized copper ores by means of a sulfur dioxide solution has been proposed but has generally been carried out in such manner as to involve the production of acid sulfites by maintaining sulfur dioxide in excess during the leaching operation and subsequent precipitation of the copper as sulfites by driving off the excess of sulfur dioxide. This method of operation, while apparently simple, has not resulted in successful commercial operation, notwithstanding large expenditure of time, money and effort by many metallurgists. The process is, moreover, open to the objection that the metal is recovered in sulfite form.

The main object of the present invention is to utilize sulfur dioxide as a leaching agent in such manner as to provide a practical commercially operative process capable of successful operation on a large scale and applicable to wholly oxidized ores or to the ores containing both oxidized (or other non-sulfide) and sulfide constituents, and capable of recovering the values in metallic form, from the non-sulfide constituents. The term non-sulfide ore is here used as covering any ore except the sulfide ores, and applies especially to oxide (or oxidized) ore, carbonates, silicates, and also native copper.

According to the present invention, sulfur dioxide is applied to the ore, together with water, and with oxygen in such manner that the copper is brought into solution eventually in the form of a sulfate, such sulfate being then treated for precipitation for the recovery of metallic copper therefrom. In carrying out the process, the sulfur dioxide is supplied as a constituent of hot gases containing oxygen and passed in counter-current to a pulp consisting of the ore, together with water, or solution, in such manner that the sulfur dioxide is absorbed by the pulp while the latter is still cool, resulting in the formation of copper sulfite, and, then as the pulp containing the copper sulfite and sulfur dioxide is maintained in contact with the hot gases containing oxygen, the copper sulfite becomes oxidized to copper sulfate and the solution becomes gradually heated by absorption of heat from the gases, so that the excess of sulfur dioxide is eventually expelled from the solution and is returned to the counter-current cycle. By this operation the maximum efficiency of solution is attained and the sulfur dioxide is effectively utilized with minimum waste.

Another object of the invention is to provide, in some cases, for utilization of pyritic ore as a source of a sulfur dioxide gas used in the process, and also of the metallic iron required for the precipitation of the copper.

In the accompanying drawings, Fig. 1 is a longitudinal section.

Fig. 2 is a transverse section of an apparatus carrying out the leaching operation above described.

Fig. 2ª is an enlarged section of the pulp outlet and gas inlet for the apparatus.

Fig. 4 is a flow sheet similar to Fig. 3, except that the copper is recovered by precipitation followed by flotation.

Fig. 5 is a flow sheet for a process wherein the metal is recovered by electrolytic precipitation.

Figure 1:
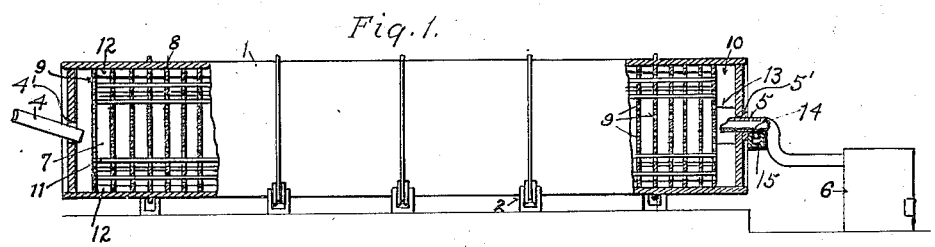
Figure 2:
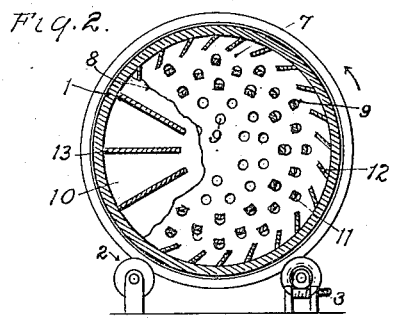

The apparatus shown in Figs. 1 and 2 comprises a drum 1 mounted on bearings 2, provided with driving means 3 to rotate slowly, with means 4 to feed ore pulp into it at one end, and with means 5 to discharge the leached pulp at the opposite or exit end, which exit end is also the point of entry of the gas carrying sulfur dioxide and oxygen, so as to cause said gases to pass in reverse direction or counter-current to the movement of the ore pulp therein. The said gases may be supplied from a roaster 6. The interior of the drum 4 is divided into compartments 7 by a series of transverse partitions 8, each of which is provided with a plurality of openings 9 through which the ore pulp may pass through the successive compartments 7 to the end or discharge compartment 10. Longitudinal bars or baffles 11 and buckets or lifters 12 are provided in each compartment 7 and lifters or buckets 13 are provided in compartment 10. The ore pulp is fed into the first compartment 7, drops to the bottom of said compartment; the buckets or lifters 12 in their ascending movement caused by the rotation of the drum raise the ore pulp until it is spilled on the horizontal bars 11 below in such manner that the ore pulp is splashed and distributed over the surfaces of the bars and against the transverse partitions 8 in fine descending drops and particles, thereby insuring intimate and prolonged contact between the ore particles and the counter-current sulfurous and oxidizing gases. With a constant feed of ore pulp into the drum 1, a flow is established within the drum so that the pulp is gradually passed through the successive compartments 7 into the last or discharging compartment 10, the lifters 13 of which raise the pulp and drop it into the discharge or exit pipe 5 whereby it is conducted through trap opening 14 to discharge launder 15. The ore pulp feed means consists of a chute 4 leading through an opening 4' at one end of the drum, and the pulp discharge means 5 consists of a pipe making a gas tight joint with an opening 5' at the other end of the drum and having a connection 14 to a discharge launder 15, and a pipe connection 16 to roaster 6.

The pulp enters one end of the drum 1 cold. The $SO_2$ charged air or gas enters the opposite end hot, and a counter-current flow is developed which results in the pulp becoming progressively warmer and the gas becoming correspondingly colder until the pulp at the discharge end is heated to any desired temperature.

We have discovered that when $SO_2$ is introduced as a hot dilute gas containing less than 4 per cent $SO_2$ by volume (the balance of the gas being largely air, which has lost a portion of its oxygen, and which may contain the various impurities commonly found in roaster gases) and is projected into a fine spray of hot pulp or solution that the absorption of $SO_2$ is practically negligible and that these hot pulps or solutions will contain practically no free $SO_2$ and will discharge from the drum as practically neutral pulp or solution. We have determined by experimental work on a 100 ton scale that the approximate temperatures necessary to effect this expulsion of $SO_2$ vary for different strengths of $SO_2$ as follows: 35° C. or over for a gas carrying 1 per cent $SO_2$; 45° C. or over for a gas carrying 2 per cent $SO_2$; 50° C. or over for a gas carrying 3 per cent $SO_2$. The absorption of $SO_2$ is progressively greater as it comes in contact with the colder pulp, and the presence of a large excess of other gases limits the absorption to a small fraction of the $SO_2$ absorbing power of cold water. Furthermore, any free $SO_2$ in solution is expelled as the pulps become heated in their travel towards the discharge end. Free acid will attack iron; therefore, to reduce the consumption of iron in the precipitation of copper from sulfate solutions the pulp discharge from the drum must be practically neutral. This is an additional reason for maintaining certain temperature of solution in the drum near the discharge end.

The operating conditions of the drum may be summarized as follows:

Sufficient $SO_2$ must be introduced to effect rapid solution and at the same time sufficient oxygen must be present to effect the rapid oxidation of sulfites to sulfates. Sufficient sulfur (in whatever form) must be burned to heat the gas to the point which will produce the desired terminal pulp temperatures. The density of the ore pulp will be one limiting factor in the capacity of the drum since 3 per cent appears to be the desirable maximum $SO_2$ content of the gas if good oxidation is to be effected. Thus for each particular case, there is a proper relation between pulp density, admission temperature of gas, dilution of gas and leaching efficiency, which will determine the quantity of pyrite to be burned. Approximations may readily be made in each case from a knowledge of the conditions; subsequent regulation of the variable conditions is a simple matter; from this, the requirements may be accurately determined and positively maintained. It may be assumed that very seldom will a greater dilution than one and one-half parts of water to one part of ore be necessary to obtain the proper conditions for rapid dissolution, while in many cases a one to one pulp will be found satisfactory.

One specific instance may be cited to illustrate this relation. A plant operating a drum 7½ feet in diameter and 40 feet in length (inside dimensions) developed a capacity of 100 tons per twenty-four hours of 48 mesh material pulped one and one-half to one, containing roughly one per cent of copper in non-sulfide form and one per cent of copper in sulfide form, with a leaching efficiency of 85 per cent on the non-sulfide contents. The pyrite requirement at this plant is approximately 3 tons of iron pyrite containing 40 per cent sulfur in order to raise the temperature of the pulp from 26° C. admission temperature to 46° C. at the exit, delivering a 2 per cent $SO_2$ gas.

The above described process results in the production of a solution of copper sulfate mixed with the pulp residue. In order to recover the copper from this solution various methods may be adopted according to the particular conditions of the ore and other factors relating to the expense of such recovery. Some of the methods of operation are illustrated in the flow sheets on the accompanying drawings, it being understood that these flow sheets pre-suppose the presence of sulfide, as well as non-sulfide, ore in the material being treated, and in case sulfide ores are absent, the steps of flotation, etc., appropriate to the separation thereof, will be omitted.

Fig. 1 is a flow sheet for the process involving recovery of copper from clear sulfate solution, after the latter has been separated from the exhausted pulp by decantation or filtration. In case sulfides are absent from the ore, the first flotation indicated may be omitted as shown by the dotted line leading from the "fine grinding" to the "tails". The pulp passing from the leaching drum above described is filtered or decanted, for example, by counter-current decantation in suitable apparatus 20, to produce a clear solution of copper sulfate. This solution is then passed to suitable blower cells or tanks 21, wherein air is blown through it, with the result that any remaining $SO_2$ is completely expelled. The solution then passes to precipitating tanks or cells 22, preferably arranged for counter-current operation. In general, metallic iron is the most suitable precipitant, and, in many cases, it is desirable to provide for production of such iron adjacent to the extracting plant, to avoid the expense of importing the same.

This flow sheet also illustrates a preferred method of obtaining at one operation the sulfur dioxide required for the extraction above described and metallic (sponge) iron for precipitation of the copper from the clear solution.

Iron pyrites, with or without auxiliary minerals, such as chalcopyrite, is crushed and roasted in roaster 19 (producing gases containing $SO_2$ and O) and the hot calcines, which may contain copper as well as iron are passed to a suitable deoxidizing apparatus wherein the iron (and also the copper present, if any) are reduced to metallic condition, preferably in such manner that the iron is in the form of sponge iron. This deoxidizing operation may be performed in any suitable apparatus 23 adapted to subject the roasted ore to the action of a reducing agent, such as a reducing gas (for example, producer gas), or such as carbon mixed with the ore, at such temperature as to cause the iron in the ore to be reduced to the required extent, to the condition of metallic sponge iron, the temperature being insufficiently high to fuse the iron so reduced. The gases produced in the roasting operation and containing sulfur dioxide and oxygen are passed, while still hot, into the extracting drum 1 to effect the leaching operation above described. The metallic iron produced in the deoxidizing apparatus is passed to the precipitating apparatus 22, which may be of any suitable type, and may comprise a series of agitating or pulping tanks 25, alternating with settling tanks 26, whereby the iron is presented successively to stronger or more pregnant solutions, and the barren or waste solution is drawn off at one end of the series and the cement copper at the other end. This cement copper also contains the residue from the calcines (including the gold, silver and copper in the original pyrites), and may be smelted or treated in apparatus 30, in the usual manner for production of the metal or metals in desired form. As indicated at 27, sulfur dioxide gas may be supplied to the leaching drum in any other suitable manner, and, as indicated at 28, the iron for precipitation may be supplied otherwise than by the apparatus 23, for example, scrap iron may be used, if available.

In some cases there may be sufficient sulfur dioxide in the stack gases from the smelter 30 to enable the same to be used as a source of sulfur dioxide, as indicated by the connection 31 from the smelter 30 back to the gas intake of the extracting drum 1.

In case it is desirable to prevent any possible detrimental effect from the escape into the atmosphere of the $SO_2$ in the gas discharged from the extracting or lixiviation drum 1; or in case it is desired to utilize the full effect of all the $SO_2$ generated; or in case longer contact is desired between the reagent and the mineral; a tower 33, or other system, may be introduced into which the gas as it leaves the lixiviation barrel is conducted, either with the pulp or counter-current to the pulp (or part of the pulp), a preliminary leach being thus effected. The pulp discharge from this preliminary leach would then be fed direct into the $SO_2$ lixiviation drum.

Another method of recovering $SO_2$ from the gas as discharged from the drum would be by condensation, as would be effected, for instance, in a drip-tower, with or without the use of steam as a collector. The resulting condensed $SO_2$ solution would then be introduced into the pulp-intake-end of the $SO_2$ lixiviation drum.

In some cases mechanical methods, such as gravity concentration, or flotation, may be used for recovering the metallic (cement)

copper as well as the sulfide copper and in that case the operations may follow the flow sheet of Fig. 4. In connection with recovery by flotation, the cleaning of the sulfide copper by the action of the leaching solution in the lixiviation drum 1 is of advantage in enabling cleaner and more efficient flotation.

Figure 3:
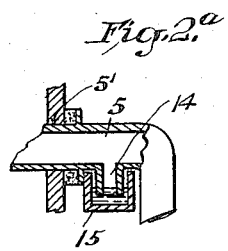
Fig. 3 is a flow sheet showing one method of applying the invention to the recovery of copper from mixed sulfide and non-sulfide ores in such manner that the copper is recovered by precipitation from clear solution.
Figure 3:
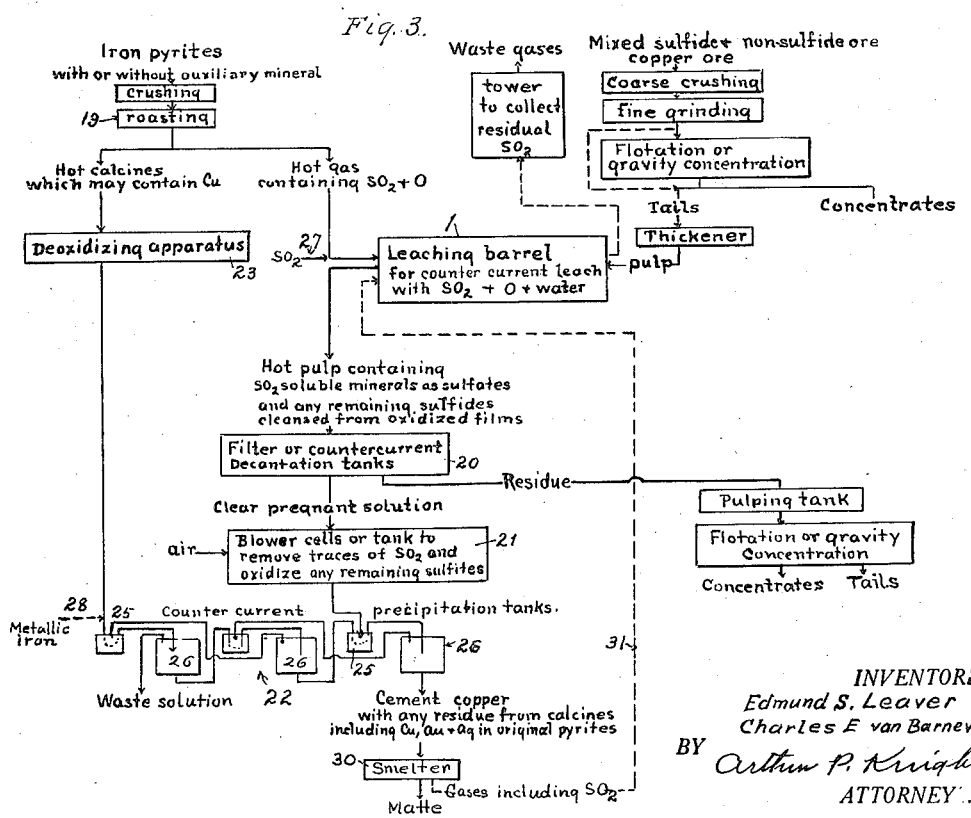

It will be understood that the flotation (or the gravity concentration, as the case may be) may be effected in any suitable manner by any of the usual flotation apparatus, or by the use of tables, vanners, etc., as the case may be, and that in this case, as in Fig. 3, the sulfur dioxide for extraction with other iron for precipitation may be furnished either from the pyrites roasting and deoxidizing apparatus 19 and 23, or from any other suitable sources.

In the case there is any considerable amount of sulfide present in the pulp (for example, by reason of failure of the preliminary flotation in a flotation apparatus 38, before the lixiviating operation, to effectively float the values on account of the oxidized coating thereon) the pulp may be subjected to a second flotation, or to gravity separation, by apparatus indicated at 39, to separate such residual sulfide values. Or, in some cases, the preliminary flotation or the gravity separation may be omitted and the flotation or gravity separation of sulfides may be wholly effected after the lixiviating operation.

In case it is preferred to recover by electrolysis, the copper, or other metal, from the solution passing from the lixiviating drum 1, the flow sheet shown in Fig. 5 may be followed—this flow sheet indicating the ordinary method of cyclic operation with solution followed by the electrolysis and return of the relatively barren solution to the leaching apparatus, with the exception that the leaching in this case is primarily by $SO_2$ solution, followed by oxidation to produce copper sulfate solution. This process has the special advantage over the usual sulfuric acid leach, in this connection, that the presence of $SO_2$ serves to keep the iron in ferrous condition, eliminating the necessity of special reducing tower.

In some cases, the copper may be precipitated from the sulfate solution by the action of sulfur dioxide under pressure and heat (with or without neutralization with lime), so as to precipitate metallic copper. Or, if desired, the copper may be precipitated as sulfide, by $H_2S$ for example, and the sulufide then treated in any suitable manner for production of the metal.

What we claim is:

1. The process which consists in treating pulp containing a non-sulfide ore-material, together with water, to the action of hot gases containing sulfur dioxide and oxygen, to produce metallic sulfate in solution, precipitating the metal from such sulfate by a precipitating agent and separating the metal so precipitated.

2. In the recovery of metallic values from ore containing sulfide and non-sulfide constituents, the process which consists in treating a pulp containing such constituents to the action of hot gases including sulfur dioxide and oxygen, to produce metallic sulfate in solution and to remove oxidized material from the sulfide constituents, precipitating the metal from such solution by the action of a precipitating agent, separating such metal and also separating from the pulp the sulfide constituent thereof.

3. A process, according to claim 2, in which a part of the sulfide constituent is separated from the pulp by concentrating operation before treatment with sulfur dioxide and oxygen, and residual sulfide is separated from the pulp by concentrating operation after treatment with sulfur dioxide and oxygen.

4. In the recovery of metallic values from ores, the step which consists in passing pulp comprising divided non-sulfide ore material and water in counter-current with hot gases containing sulfur dioxide and oxygen to cause the sulfur dioxide to be first absorbed by the water, converting the non-sulfide metal values in the pulp to the form of sulfite and oxidizing the sulfite to sulfate by the action of the oxygen and of the heat of the gases, and the excess sulfur dioxide being expelled from the water as the latter becomes heated by the gases so as to pass back into the stream of gases passing in countercurrent to the cold pulp so as to cause such sulfur dioxide to be re-absorbed in such cold pulp.

In testimony whereof we have hereunto subscribed our names this 29th day of May, 1919.

EDMUND S. LEAVER.
CHARLES E. van BARNEVELD.